United States Patent [11] 3,601,412

| [72] | Inventor | Sven-Erik Malmstrom<br>Reftele, Sweden |
|---|---|---|
| [21] | Appl. No. | 15,183 |
| [22] | Filed | Feb. 27, 1970 |
| [45] | Patented | Aug. 24, 1971 |
| [73] | Assignee | Forsheda Gummifabrik AB<br>Forsheda, Sweden |

[54] ARRANGEMENT FOR MOUNTING AND AXIALLY FIXING A SHAFT SEAL
9 Claims, 19 Drawing Figs.

[52] U.S. Cl. .................................................. 277/94, 277/11
[51] Int. Cl. .................................................. F16j 15/54
[50] Field of Search .......................................... 277/94, 81, 9, 11

[56] References Cited
UNITED STATES PATENTS
2,962,308  11/1960  Cobb ............................ 277/94

3,425,758  2/1969  Scheifele ..................... 277/94 X
FOREIGN PATENTS
1,474,978  2/1967  France ........................ 277/94

Primary Examiner—Robert I. Smith
Attorney—Howson and Howson

ABSTRACT: An arrangement for the mounting and axial fixation of shaft seals of the type consisting of a rubber ring stretched around the shaft and providing a point of fastening for an integrating funnel-shaped sealing lip, which seals axially against a sealing surface that is essentially perpendicular to the longitudinal direction of the shaft, characterized by the fact that a support securely fastened at points in connection with the sealing surface and against which a ring-shaped support surface effected on the rubber ring then slides when the shaft turns, whereby the support is so positioned with respect to the sealing surface that the sealing lip assumes a correct axial position with respect to the sealing surface after one revolution.

INVENTOR:
SVEN ERIK MALMSTROM

INVENTOR:
SVEN ERIK MALMSTROM
BY
Howson & Howson
ATTYS.

ARRANGEMENT FOR MOUNTING AND AXIALLY FIXING A SHAFT SEAL

This invention proposes an arrangement for the mounting and axial fixation of shaft seals of the type that consist of a rubber ring stretched around the shaft, which acts as a holder for an integrating funnel-shaped sealing lip, the sealing of which takes place axially against a sealing surface that is essentially perpendicular to the longitudinal direction of the shaft. Such sealing arrangements are represented, among others, by the so-called V-ring, the funnel-shaped lip of which makes up the inner portion of the rubber ring. When this type of seal is involved, it is important that the sealing lip assumes the correct position with respect to the sealing surface in order to assure a good sealing effect. Even if the natural tension in the rubber ring in many cases is sufficient to fix the seal on the shaft, it is still advisable in oil-lubricated applications to arrange an axial support of some type behind the rubber ring to prevent it from sliding back. Such supports are, for example, a shoulder, a channel or a metal ring securely fastened to the shaft. Such arrangements obviously do stop the ring from sliding back along the axle but do not resolve all the problems in connection with the sealing of divided sealing walls due to the reasons that will be more thoroughly discussed below. A plate ring securely fastened at the sealing wall against which the rubber ring slides has also been proposed. However, this support arrangement is plagued with the same disadvantages as above. In this case, the friction between the support and the rubber ring may be considerable and lead to an unacceptable amount of wear.

The purpose of this invention is to improve the above-mentioned support arrangement. Its characteristic feature is a support that is securely fastened at points to the sealing surface and against which a ring-shaped support surface effected on the rubber ring successively slides when the shaft rotates. The support is so arranged with respect to the sealing surface that the sealing lip assumes a correct axial position with respect to the sealing surface after one revolution.

The invention also deals with a further development of the basic concept consisting of the fact that the support element alone or in combination with the wall is applied against two support surfaces on the rubber ring, one of which faces the sealing surface and the other faces the opposite direction. By means of this arrangement, the rubber ring is guided axially in both directions and an axial shift of the shaft does not affect the position of the sealing ring with respect to the sealing surface because the ring slides along the shaft.

In order to explain the invention more thoroughly, a number of representative structural forms are described in the following in connection with the attached drawings, wherein.

FIGS. 5-8b inclusive show different constructions of supports designed to take up the axial movement in two directions.

Figure 9:
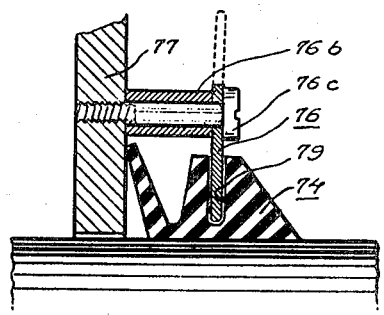

FIG. 9 shows a support arrangement principle that differs from FIGS. 5-8b and FIGS. 10a-12 illustrating varying structural forms based on the principle in FIG. 9.

Figure 13:
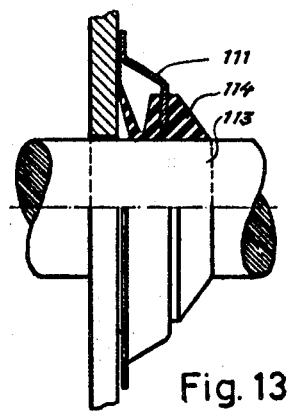

FIG. 13 illustrates how a sealing arrangement of the type shown in FIGS. 9-12 can be used to increase the repellent effect of the seal.

Figure 14:
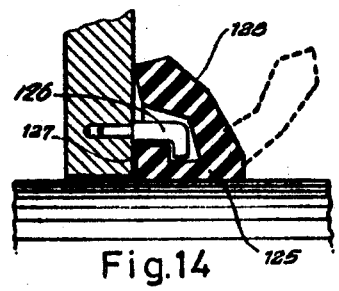

FIG. 14 illustrates a principle for adapting the invention to a somewhat different sealing type which FIGS. 1-13 cover examples with V-rings.

Figure 1:
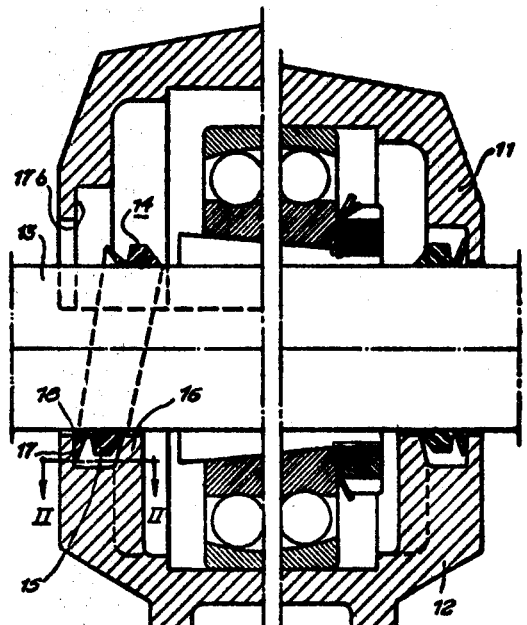
FIG. 1 shows a cross section through a bearing housing provided with an integrated support in accordance with the invention.
Figure 2:
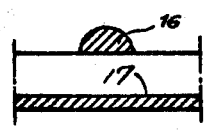
FIG. 2 is a cross section along the line II—II of FIG. 1 and shows one part of the support.
Figure 12:
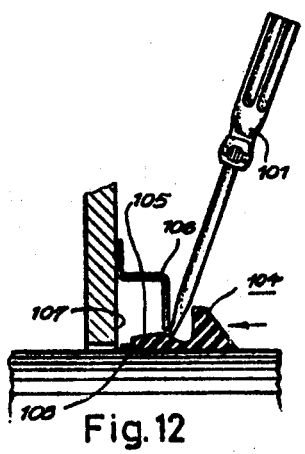

In FIG. 1, 11 and 12 denote an upper and a lower bearing housing half for a so-called steel bearing housing. The left side of the figure shows the upper bearing housing half 11 in an elevated position and a V-ring 14 stretched around a shaft member or the like 13. The lower portion of the V-ring 14 is mounted with its retainer 15 pressing against a support 16 that is manufactured in one piece with the lower bearing half. FIG. 2 shows a cross section through the support 16. The distance between the sealing surface 17, against which the lip 18 of the V-ring presses, and the support 16 is identical with the axial installation dimensions of the V-ring; therefore, the sealing position of the lip in the center of the support is correct with respect to the sealing wall when the retainer is pressing against the support 16. Before installing the upper bearing half, the upper portion of the V-ring is pushed back far enough so that the lip cannot make contact with the sealing surface 17b on the upper bearing half when it is lowered into the position shown in the upper portion of FIG. 1. When the shaft rotates, the support 16 then shifts the V-ring against the sealing wall and after one revolution the V-ring has assumed the position shown in the lower portion of the figure. The purpose of this arrangement is twofold; the V-ring always assumes the correct sealing position and the assembly is facilitated. Actually, it has proved to be quite difficult to effect the so-called concealed assembly of a V-ring in a divided bearing. If the V-ring is in fact placed against the lower bearing half in the correct position, the lip is likely to be squeezed between the halves when they are put together. This danger is completely eliminated with the arrangement in FIGS. 1 and 2.

Figure 5A:
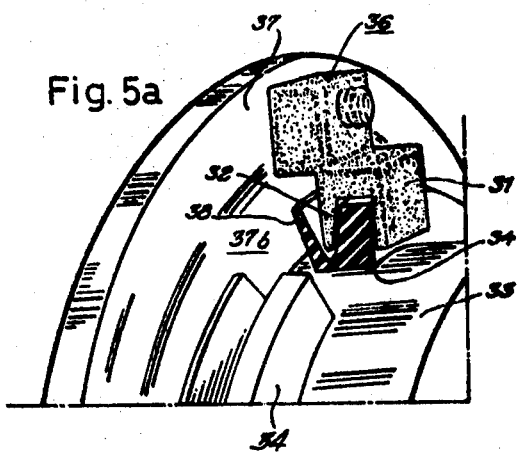
Figure 3:
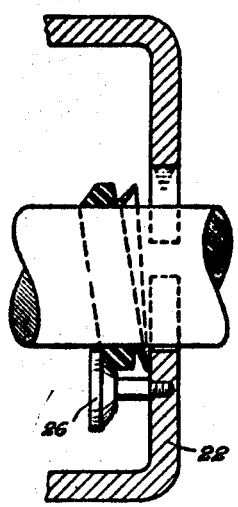
FIGS. 3 and 4 illustrate a somewhat divergent structural form in which the support is detachable.
Figure 4:
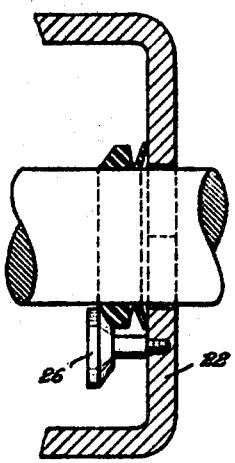
Figure 5B:
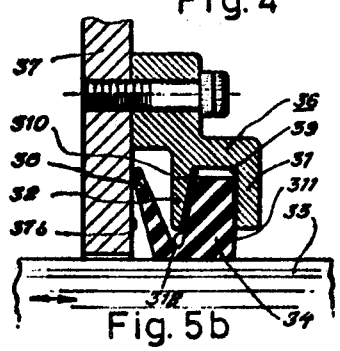

The sealing arrangement according to FIGS. 3 and 4 differs somewhat from those previously described. The difference resides basically in the fact that the support 26 consists of a rotating body, preferably turned on a lathe, which is threaded into the under bearing half 22. This arrangement is advantageous in existing constructions that can be complimented simply with an effective support and assembly arrangement. While the support 26 in FIGS. 3 and 4 consists of a lathe-turned piece, support 36 in FIGS. 5a and 5b is prepared in such a manner that a shaped bar stock is cut into the appropriate lengths. Support 36 is conveniently screwed tightly with the sealing wall 37. The support consists of two parts, 31 and 32, which are directed radially against the center of shaft 33. They are shaped so that their inner sides 39 and 310 press against the two sides 311 and 312 on a V-ring 34. The V-ring is guided in two directions, the shaft 33 can be allowed to shift in one or the other direction with no danger of the sealing lip 38 losing contact with the sealing surface 37b or pressing excessively hard against it. A support 36, shown in FIGS. 5a and 5b thus provides positive guidance to the V-ring with respect to the sealing surface.

Figure 6:
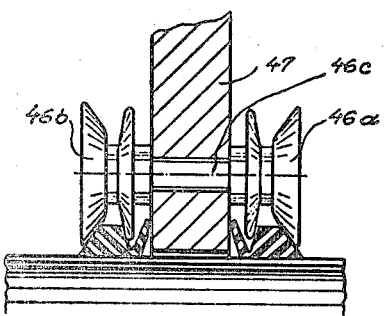
Figure 7A:
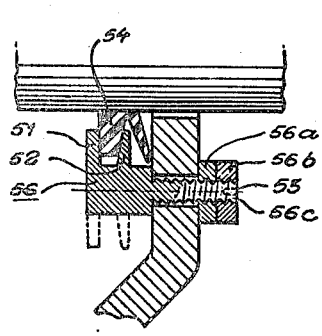
Figure 7B:
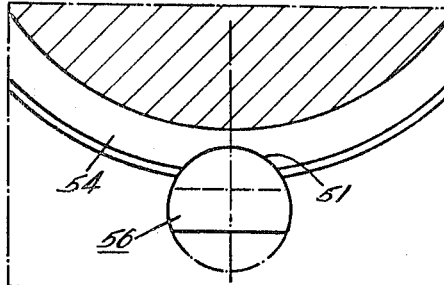
Figure 8B:
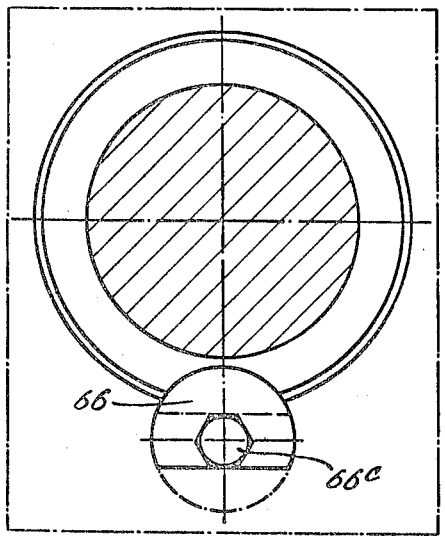
Figure 8A:
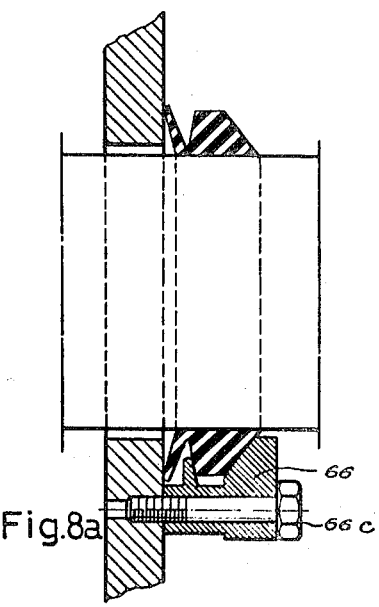

In certain applications, a two-sided seal is required, e.g., where the sealing wall separates two spaces, one of which contains oil and the other a mixture of dirt, mud, dust, etc., such a sealing arrangement is illustrated in FIG. 6. With a back-and-forth movement in the shaft, for example, during warming up and cooling off, the sealing rings must be fixed axially with respect to the sealing surfaces and must be able to slide on the shaft when it shifts. For this purpose, the sealing wall 47 is provided with two supports, 46a and 46b, basically of the same construction as the support 36 in FIGS. 5a and 5b. The supports 46a and 46b are, however, lathe-turned, and shaped like nuts, which are fastened with a bolt 46c. The arrangements illustrated in FIGS. 7a and 7b and FIGS. 8a and 8b differ from the previous ones in FIGS. 5a and 5b and FIG. 6 only with respect to the means of fastening the supports and to a certain extent the shape of these latter. Thus, FIGS. 7a and 7b show a fastening arrangement that consists of a clamping and locking arrangement. Two nuts, 56a and 56b, are threaded on a screw 56c that forms an integral part of support 56. 56b is for the purpose of locking nut 56a as soon as the support is fastened tightly in the correct position with it. As can be seen from FIG. 7b, a portion of the ring-shaped flanges 51 and 52 of the support are removed. The purpose of this is to be able to mount the V-ring in cases when the bearing housing is not divided. The projecting flanges 51 and 52 are then mounted downward as shown by the dashed line in FIG. 7a. V-ring 54 is shifted against the sealing surface and the support 56 is turned with the aid of a screw driver through a channel 53 so that the flanges 51 and 52 grip on the body of the V-ring. While the arrangement in FIGS. 7a and 7b is designed for a concealed assembly, i.e., the position of the V-ring cannot be controlled from the outside, the arrangement in FIGS. 8a and 8b can be employed in applications where the V-ring is accessible for adjustment and inspection. The support 66 can then be fastened axially with the aid of a bolt 66c.

Figure 10A:
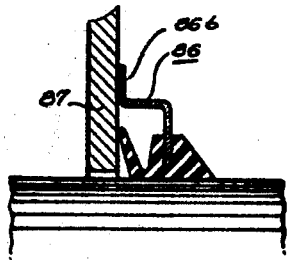
Figures 11A, 11B:
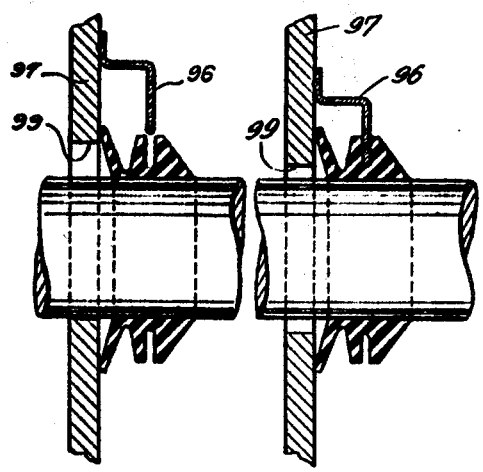
Figure 10B:
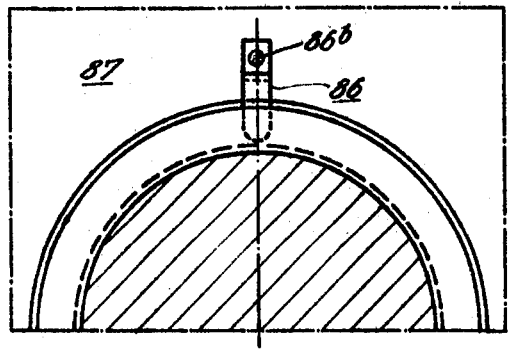

The retainer on a V-ring 74 can be provided with a slot 79 that extends through the greater portion of it, as can be seen in FIG. 9. This arrangement simplifies the appearance of support 76, which in this case can consist of a plate of suitable metal or steel wire coil and which is fastened securely against the sealing wall 77 via a bushing 76b with the aid of a screw 76c. The support plate 76 is eccentrically fastened and during installation can be turned up into the position shown in FIG. 9 by dashed lines. During mounting, the V-ring is shifted forward until the slot 79 is in line with the support plate 76, which falls into the slot and is tightly fastened. The arrangement in FIG. 9 is designed especially for production in shorter series. When long series are involved, it is more convenient to employ an arrangement in accordance with FIGS. 10a and 10b or FIGS. 11a and 11b where the support consists of a strip plate 86 that is bent in a zigzag manner and is fastened to the sealing wall 87 with the aid of a spot weld 86b. However, it should be noted here that this arrangement can be used only with a split sealing surface. If the sealing surface is integral, an arrangement in accordance with FIGS. 11a and 11b must be employed. The space 99 in the sealing wall 97 must be large enough so that the body of the V-ring in the position shown in FIG. 11a can be shifted under support 96 so that when moved to the center position it assumes the position shown in FIG. 11b. If an arrangement in accordance with FIGS. 11a and 11b should not be acceptable for any reason, it is still possible to mount the V-ring, conveniently in the manner shown in FIG. 12. Lip 108 of the V-ring 104 and the forward portion of the body 105 of the V-ring are forced in under support 106 with the aid of a screw driver 101 or similar tool at the same time as the V-ring is adjusted inward against the sealing surface 107 until it assumes the same position as shown in FIG. 10a.

A slot in the body of the V-ring in accordance with FIG. 9, for example, can be utilized not only to hold the seal in the correct sealing position but also for other purposes, as exemplified in FIG. 13. A ring-shaped plate washer 111 is inserted into the slot before the V-ring 114 is mounted, is carried along with the rotation and acts as a highly effective repelling arrangement when placed around the shaft 113. The plate washer 111 can also act at high revolution speeds to hold the V-ring pressed against the shaft and to a certain extend eliminate the effect of centrifugal forces that tend to loosen the grip of the retainer around the shaft at peripheral speeds of approximately 15m. Finally, FIG. 14 illustrates a seal consisting of a retainer 125 and a funnel-shaped lip 128 projecting out from the back of it and which can be flipped back to the position shown in the figure by dashed lines. An angularly curved support 126 grips the retainer part 125, which thereby acquires a fixed position between the sealing wall 127 and the support 126. After this support is mounted, the lip is dropped back into the sealing position.

I claim:

1. The combination comprising a seal adapted to be mounted on a shaft or the like to provide a seal between the shaft and a member rotatable relative to the shaft and having a sealing surface extending transversely to the axis of the shaft, said seal including a body portion and a flexible annular lip projecting from said body portion, and a support mounted on said member adjacent said sealing surface engageable with said seal whereby upon relative rotation of said shaft and member the annular sealing lip assumes a correct position in sealing engagement with said sealing surface.

2. The combination as claimed in claim 1 wherein said body portion has inner and outer axial end faces and wherein said support includes guide means confronting the inner and outer axial end faces whereby the sealing lip maintains contact with the sealing surface when the shaft is shifted longitudinally relative to said member.

3. The combination as claimed in claim 2 wherein said guide means includes a pair of radially directed spaced guide flanges.

4. The combination as claimed in claim 3 wherein said radially directed flanges are selectively adjustable between a first position wherein the flanges confront the inner and outer axial end faces of said seal, and a second position wherein the flanges are in nonconfronting relation thereto.

5. The combination as claimed in claim 1 wherein the body portion includes inner and outer axial end faces and said support member includes rotatable means adapted to engage the outer axial end face of said body portion.

6. The combination as claimed in claim 1 wherein said body portion includes a radially directed circumferentially extending groove and wherein said support includes a flange engageable in said groove.

7. The combination as claimed in claim 6 wherein said flange is mounted by means of a screw engageable in said member adjacent said sealing surface and a collar circumscribing said screw to position the flange in a predetermined position relative to the groove in said seal.

8. The combination as claimed in claim 1 wherein said support is a one-piece member of zigzag configuration having a portion engageable in a groove in the body portion of said seal.

9. The combination comprising a pair of seals adapted to be mounted on a shaft or the like to provide a seal between the shaft member and a member rotatable relative to the shaft member and having a wall portion extending transversely to the axis of the shaft, each of said seals including a body portion and a flexible annular lip projecting from said body portion adapted to engage the wall on opposite sides thereof, and a support mounted on said member engageable with each of said seals whereby upon relative rotation of said shaft and member the annular sealing lips are maintained in a correct position in sealing engagement with said wall.